(12) United States Patent
Lee (10) Patent No.: US 12,529,557 B2
(45) Date of Patent: Jan. 20, 2026

(54) PROCESSING SYSTEM FOR REDUCING DATA AMOUNT OF A POINT CLOUD

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 579 days.

(21) Appl. No.: 17/738,018

(22) Filed: May 6, 2022

(65) Prior Publication Data

US 2022/0375029 A1 Nov. 24, 2022

Related U.S. Application Data

(60) Provisional application No. 63/184,792, filed on May 6, 2021.

(51) Int. Cl.
*G06T 3/40* (2024.01)
*G01B 21/18* (2006.01)
*G06T 9/00* (2006.01)

(52) U.S. Cl.
CPC ............... *G01B 21/18* (2013.01); *G06T 3/40* (2013.01); *G06T 9/00* (2013.01)

(58) Field of Classification Search
CPC .............. G01B 21/18; G06T 3/40; G06T 9/00
See application file for complete search history.

(56) References Cited

U.S. PATENT DOCUMENTS

| | | | |
|---|---|---|---|
| 5,363,213 A | 11/1994 | Coward | |
| 5,774,573 A | 6/1998 | Caspi | |
| 10,885,703 B2 * | 1/2021 | Kerckaert | G06T 17/20 |
| 2015/0294473 A1 | 10/2015 | Michot | |
| 2017/0223334 A1 | 8/2017 | Nobayashi | |
| 2020/0134324 A1 * | 4/2020 | Zeng | G06V 10/96 |
| 2020/0143554 A1 | 5/2020 | Toldo | |
| 2020/0311912 A1 * | 10/2020 | Knoplioch | G06T 7/11 |
| 2021/0056460 A1 | 2/2021 | Wu | |
| 2021/0166052 A1 * | 6/2021 | Park | G06F 18/23 |
| 2021/0237266 A1 * | 8/2021 | Kalashnikov | B25J 9/1612 |
| 2022/0110598 A1 * | 4/2022 | Antoniades | G06T 7/45 |
| 2022/0113422 A1 * | 4/2022 | Hillard | G01S 7/4911 |

(Continued)

FOREIGN PATENT DOCUMENTS

WO 2021/016891 A1 2/2021

OTHER PUBLICATIONS

Siheng Chen, Dong Tian, Chen Feng, Anthony Vetro, Jelena Kovačević, "Fast Resampling of Three-Dimensional Point Clouds via Graphs", IEEE Transactions on Signal Processing, vol. 66, No. 3, Feb. 1, 2018, pp. 666-681, IEEE, 2018.

*Primary Examiner* — Edward Park
(74) *Attorney, Agent, or Firm* — Winston Hsu (57) ABSTRACT

A processing system for reducing data amount of a point cloud includes a sample rate controller and a transmitter. The sample rate controller is used for receiving a plurality of coordinates corresponding to the point cloud, and sampling the plurality of coordinates according to an adjustable sampling rate to generate a plurality of sampled coordinates, wherein data amount of the plurality of coordinates is not less than data amount of the plurality of sampled coordinates. The transmitter coupled to the sample rate controller is used for outputting the plurality of sampled coordinates.

6 Claims, 10 Drawing Sheets

(56) References Cited

U.S. PATENT DOCUMENTS

2022/0245771 A1  8/2022 Cho
2022/0334636 A1* 10/2022 Miettinen ............... G06F 3/013
2022/0375029 A1* 11/2022 Lee ........................ G06T 9/001
2023/0328285 A1* 10/2023 Oh ........................ H04N 19/70
                                                        375/240.02

* cited by examiner

PROCESSING SYSTEM FOR REDUCING DATA AMOUNT OF A POINT CLOUD

CROSS REFERENCE TO RELATED APPLICATION

This application claims the benefit of U.S. Provisional Application Ser. No. 63/184,792, filed on May 6, 2021. The content of the application is incorporated herein by reference.

BACKGROUND OF THE INVENTION

1. Field of the Invention

The present invention relates to a processing system, and particularly to a processing system that can reduce data amount of a point cloud.

2. Description of the Prior Art

A point cloud is usually defined as coordinates in a space or a hyperspace, so the point cloud not only contains information of coordinates of an object in the space, but also contains depth information of the object, resulting in various applications of point clouds are increasingly widespread. For example, usually point clouds in consumer electronic products exist in three-dimensional coordinates. After an electronic device obtains the three-dimensional coordinates, the electronic device can further achieve various applications such as three-dimensional reconstruction and map synthesis according to the three-dimensional coordinates.

Taking a three-dimensional (3D) point cloud as an example, since a plurality of 3D coordinates contained in the 3D point cloud (each 3D coordinate of the plurality of 3D coordinates corresponds to a pixel) are 3D coordinates with a floating-point operation format (for example, each dimensional coordinate of each 3D coordinate is represented by at least 32 bits), at least 96 bits are required to represent a 3D coordinate. If the 3D point cloud also includes color information, since each primary color of the three primary colors R, G, and B needs to be represented by 8 bits, meanwhile at least 120 (96+24) bits are required to represent a 3D coordinate. That is to say, data amount of the 3D point cloud is very large. Therefore, the electronic device needs a buffer with larger capacity and a transmitter with larger bandwidth, that is, cost of the electronic device will be increased.

Therefore, how to reduce the data amount of the 3D point cloud has become an important issue of the related field.

SUMMARY OF THE INVENTION

An embodiment of the present invention provides a processing system for reducing data amount of a point cloud. The processing system includes a sampling rate controller and a transmitter. The sampling rate controller receives a plurality of coordinates corresponding to the point cloud, and samples the plurality of coordinates according to an adjustable sampling rate to generate a plurality of sampled coordinates, wherein data amount of the plurality of coordinates is not less than data amount of the plurality of sampled coordinates. The transmitter is coupled to the sampling rate controller, wherein the transmitter is used for outputting the plurality of sampled coordinates.

According to one aspect of the present invention, the processing system further includes a spatial region of interest processor, wherein the spatial region of interest processor determines a spatial region of interest, and discards coordinates of the plurality of coordinates, which are outside the spatial region of interest according to the spatial region of interest to keep a plurality of first coordinates within the spatial region of interest.

According to one aspect of the present invention, the sampling rate controller determines whether to adjust the adjustable sampling rate according to output bandwidth of the plurality of first coordinates and a buffer further included in the processing system, and samples the plurality of first coordinates according to the adjustable sampling rate to generate a plurality of sampled first coordinates.

According to one aspect of the present invention, the sampling rate controller determines whether to adjust the adjustable sampling rate according to output bandwidth of the plurality of first coordinates and a predetermined bandwidth of the transmitter, and samples the plurality of first coordinates according to the adjustable sampling rate to generate a plurality of sampled first coordinates.

According to one aspect of the present invention, the processing system further includes a fixed-point number processor, wherein the fixed-point number processor converts the plurality of coordinates with a floating-point operation format into a plurality of second coordinates with a fixed-point number operation format.

According to one aspect of the present invention, the sampling rate controller determines whether to adjust the adjustable sampling rate according to output bandwidth of the plurality of second coordinates and a buffer further included in the processing system, and samples the plurality of second coordinates according to the adjustable sampling rate to generate a plurality of sampled second coordinates.

According to one aspect of the present invention, the sampling rate controller determines whether to adjust the adjustable sampling rate according to output bandwidth of the plurality of second coordinates and a predetermined bandwidth of the transmitter, and samples the plurality of second coordinates according to the adjustable sampling rate to generate a plurality of sampled second coordinates.

According to one aspect of the present invention, the processing system further includes a dimension reduction processor, wherein the dimension reduction processor converts the plurality of coordinates into a plurality of dimension reduction coordinates.

According to one aspect of the present invention, the sampling rate controller determines whether to adjust the adjustable sampling rate according to output bandwidth of the plurality of dimension reduction coordinates and a buffer further included in the processing system, and samples the plurality of dimension reduction coordinates according to the adjustable sampling rate to generate a plurality of sampled dimension reduction coordinates.

According to one aspect of the present invention, the sampling rate controller determines whether to adjust the adjustable sampling rate according to output bandwidth of the plurality of dimension reduction coordinates and a predetermined bandwidth of the transmitter, and samples the plurality of dimension reduction coordinates according to the adjustable sampling rate to generate a plurality of sampled dimension reduction coordinates.

According to one aspect of the present invention, the processing system further includes a dimension reduction processor, wherein the dimension reduction processor converts the plurality of sampled coordinates into a plurality of sampled dimension reduction coordinates, wherein the transmitter is used for outputting the plurality of sampled dimension reduction coordinates.

According to one aspect of the present invention, the point cloud is a three-dimensional point cloud, and the sampling rate controller is used for receiving a plurality of three-dimensional coordinates corresponding to the three-dimensional point cloud.

According to one aspect of the present invention, each three-dimensional coordinate of the plurality of three-dimensional coordinates corresponds to a pixel and has a floating-point operation format.

Another embodiment of the present invention provides a processing system for reducing data amount of a point cloud. The processing system includes a spatial region of interest processor and a transmitter. The spatial region of interest processor receives a plurality of coordinates corresponding to the point cloud, determines a spatial region of interest, and discards coordinates of the plurality of coordinates, which are outside the spatial region of interest according to the spatial region of interest to keep a plurality of first coordinates within the spatial region of interest. The transmitter is coupled to the spatial region of interest processor, wherein the transmitter is used for outputting the plurality of first coordinates.

According to one aspect of the present invention, the point cloud is a three-dimensional point cloud, and the spatial region of interest processor is used for receiving a plurality of three-dimensional coordinates corresponding to the three-dimensional point cloud.

According to one aspect of the present invention, each three-dimensional coordinate of the plurality of three-dimensional coordinates corresponds to a pixel and has a floating-point operation format.

Another embodiment of the present invention provides a processing system for reducing data amount of a point cloud. The processing system includes a dimension reduction processor and a transmitter. The dimension reduction processor receives a plurality of coordinates corresponding to the point cloud, and converts the plurality of coordinates into a plurality of dimension reduction coordinates. The transmitter is coupled to the dimension reduction processor, wherein the transmitter is used for outputting the plurality of dimension reduction coordinates.

According to one aspect of the present invention, the point cloud is a three-dimensional point cloud, and the dimension reduction processor is used for receiving a plurality of three-dimensional coordinates corresponding to the three-dimensional point cloud.

According to one aspect of the present invention, each three-dimensional coordinate of the plurality of three-dimensional coordinates corresponds to a pixel and has a floating-point operation format.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
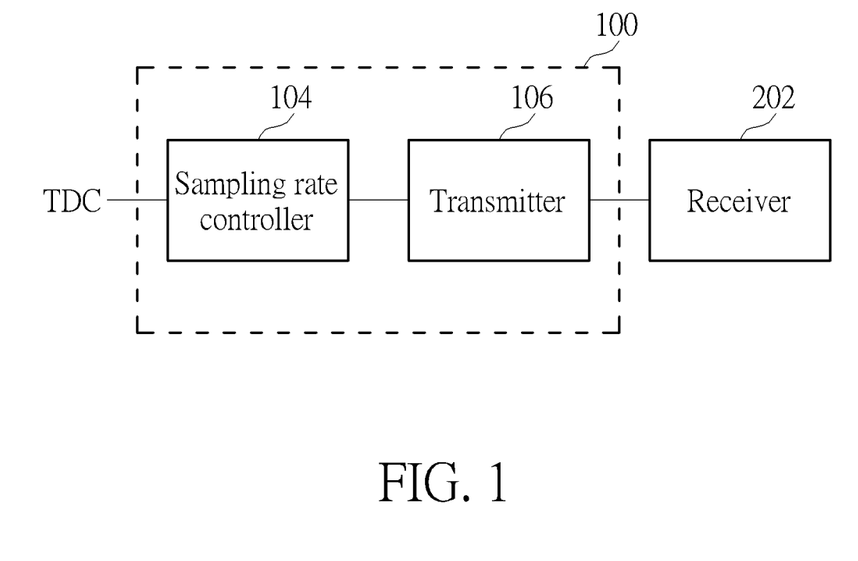
FIG. 1 is a diagram illustrating a processing system for reducing data amount of a point cloud according to a first embodiment of the present invention.

Please refer to FIG. 1. FIG. 1 is a diagram illustrating a processing system 100 for reducing data amount of a point cloud according to a first embodiment of the present invention. As shown in FIG. 1, the processing system 100 includes a sampling rate controller 104 and a transmitter 106, wherein the transmitter 106 is coupled to the sampling rate controller 104. As shown in FIG. 1, the sampling rate controller 104 can be used for receiving a plurality of coordinates TDC corresponding to a point cloud, wherein the plurality of coordinates TDC have a floating-point operation format (for example, the plurality of coordinates TDC are three-dimensional (3D) coordinates, and each dimensional coordinate of each 3D coordinate is represented by at least 32 bits), the transmitter 106 has a predetermined bandwidth, and each coordinate of the plurality of coordinates TDC corresponds to a spatial sample. But, in another embodiment of the present invention, the plurality of coordinates TDC can be two-dimensional coordinates or multi-dimensional coordinates other than three-dimensional coordinates. In addition, the plurality of coordinates TDC are inputted in the processing system 100 from outside of the processing system 100.

Figure 2:
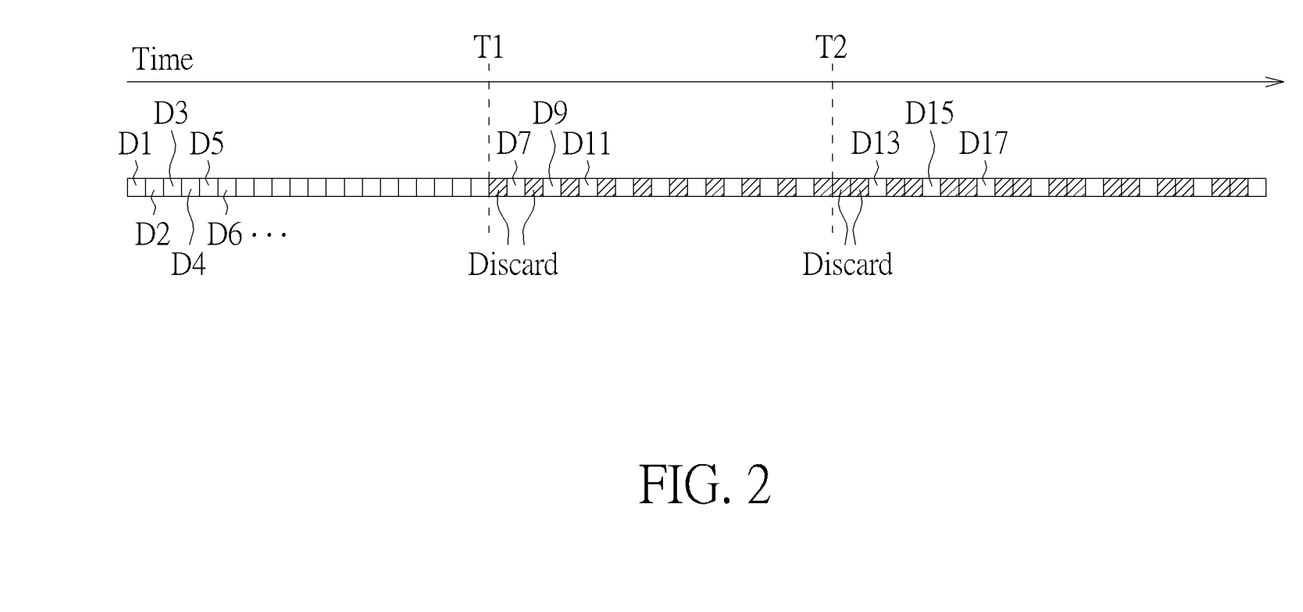
FIG. 2 is a diagram illustrating the sampling rate controller sampling the plurality of coordinates.

Because the point cloud has a characteristic of unordered transmission, the sampling rate controller 104 can determine whether to adjust an adjustable sampling rate of the sampling rate controller 104 according to output bandwidth of the plurality of coordinates TDC and predetermined bandwidth of the transmitter 106. For example, as shown in FIG. 2, before a time T1, the output bandwidth of the plurality of coordinates TDC is less than a first threshold of the predetermined bandwidth of the transmitter 106, so the sampling rate controller 104 does not adjust the adjustable sampling rate. That is, because the output bandwidth of the plurality of coordinates TDC is less than the first threshold, the sampling rate controller 104 can utilize the adjustable sampling rate with 1 time (1×) to sample the plurality of coordinates TDC. Therefore, before the time T1, the sampling rate controller 104 does not discard any coordinate in the plurality of coordinates TDC, wherein, as shown in FIG. 2, D1, D2, D3, D4, D5, D6 are coordinates. But, in another embodiment of the present invention, D1, D2, D3, D4, D5, D6 include data of coordinates and corresponding color (e.g. R, G, B), or other data. In addition, as shown in FIG. 2, between the time T1 and a time T2, the output bandwidth of the plurality of coordinates TDC is between the first threshold and a second threshold of the predetermined bandwidth of the transmitter 106 (wherein the second threshold is greater than the first threshold), so the sampling rate controller 104 makes the adjustable sampling rate be ½ times, that is, one of two adjacent coordinates of the plurality of coordinates TDC is discarded by the sampling rate controller 104. For example, between the time T1 and the time T2, coordinates with a slash (as shown in FIG. 2) are discarded by the sampling rate controller 104, wherein coordinates (e.g. as shown in FIG. 2, coordinates D7, D9, D11) in the plurality of coordinates TDC left by the sampling rate controller 104 are a plurality of sampled coordinates, and it is obvious that data amount of the plurality of coordinates TDC is greater than data amount of the plurality of sampled coordinates (that is, the processing system 100 can reduce data amount of the point cloud). In addition, as shown in FIG. 2, after the time T2, the output bandwidth of the plurality of coordinates TDC is greater than the second threshold, so the sampling rate controller 104 makes the adjustable sampling rate be ⅓ times. That is, two of three adjacent coordinates of the plurality of coordinates TDC are discarded by the sampling rate controller 104. For example, after the time T2, coordinates with a slash (as shown in FIG. 2) are discarded by the sampling rate controller 104, wherein coordinates (e.g., as shown in FIG. 2, coordinates D13, D15, D17) in the plurality of coordinates TDC left by the sampling rate controller 104 are a plurality of sampled coordinates, and it is obvious that data amount of the plurality of coordinates TDC is greater than data amount of the plurality of sampled coordinates. In addition, as shown in FIG. 2, after the sampling rate controller 104 generates the plurality of sampled coordinates, the transmitter 106 can be used for outputting the plurality of sampled coordinates to a receiver 202, wherein the receiver 202 can utilize the plurality of sampled coordinates to execute corresponding applications.

In addition, because one of ordinary skill in the art should know that the sampling rate controller 104 can be a field programmable gate array (FPGA) with the above-mentioned functions of the sampling rate controller 104, or an application-specific integrated circuit (ASIC) with the above-mentioned functions of the sampling rate controller 104, or a software module with the above-mentioned functions of the sampling rate controller 104, or an analog integrated circuit with the above-mentioned functions of the sampling rate controller 104 according to the above-mentioned functions of the sampling rate controller 104, descriptions of a corresponding structure of the sampling rate controller 104 are omitted for simplicity. In addition, because one of ordinary skill in the art should know that the transmitter 106 can be a field programmable gate array (FPGA) with the above-mentioned functions of the transmitter 106, or an application-specific integrated circuit (ASIC) with the above-mentioned functions of the transmitter 106, or a software module with the above-mentioned functions of the transmitter 106, or an analog integrated circuit with the above-mentioned functions of the transmitter 106 according to the above-mentioned functions of the transmitter 106, descriptions of a corresponding structure of the transmitter 106 are also omitted for simplicity.

Figure 3:
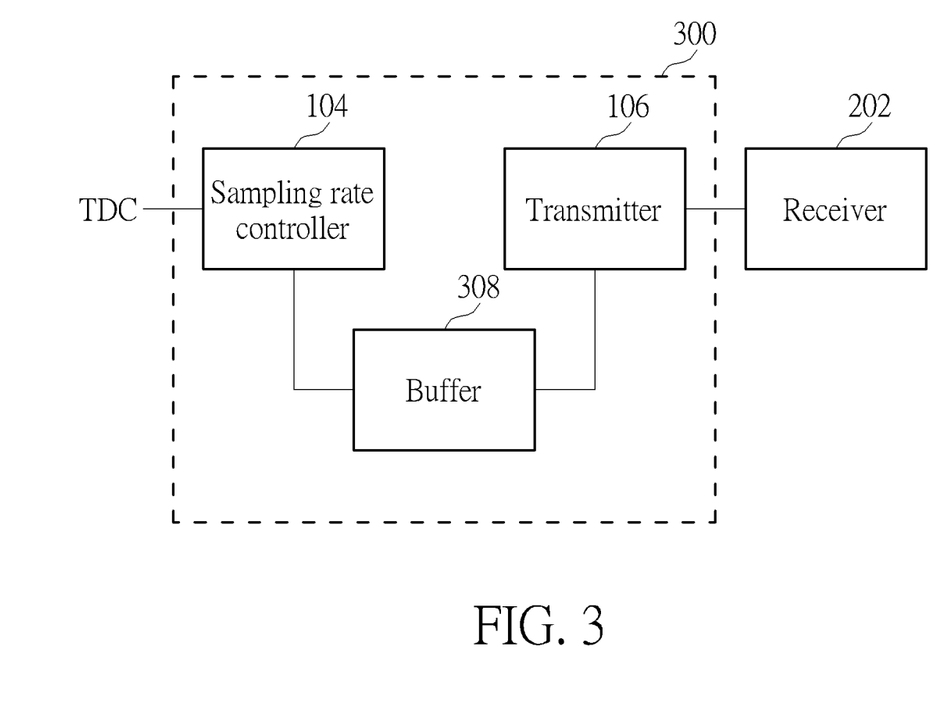
FIG. 3 is a diagram illustrating a processing system for reducing data amount of a point cloud according to a second embodiment of the present invention.

Please refer to FIG. 3. FIG. 3 is a diagram illustrating a processing system 300 for reducing data amount of a point cloud according to a second embodiment of the present invention. As shown in FIG. 3, a difference between the processing system 300 and the processing system 100 is that the processing system 300 further includes a buffer 308, wherein coupling relationships between the sampling rate controller 104, the transmitter 106, and the buffer 308 can be referred to FIG. 3, so further description thereof is omitted for simplicity. In addition, in one embodiment of the present invention, the buffer 308 is a static random access memory (SRAM). But, the present invention is not limited to the buffer 308 being a static random access memory, that is, the buffer 308 can be other types of memory.

Figure 4:
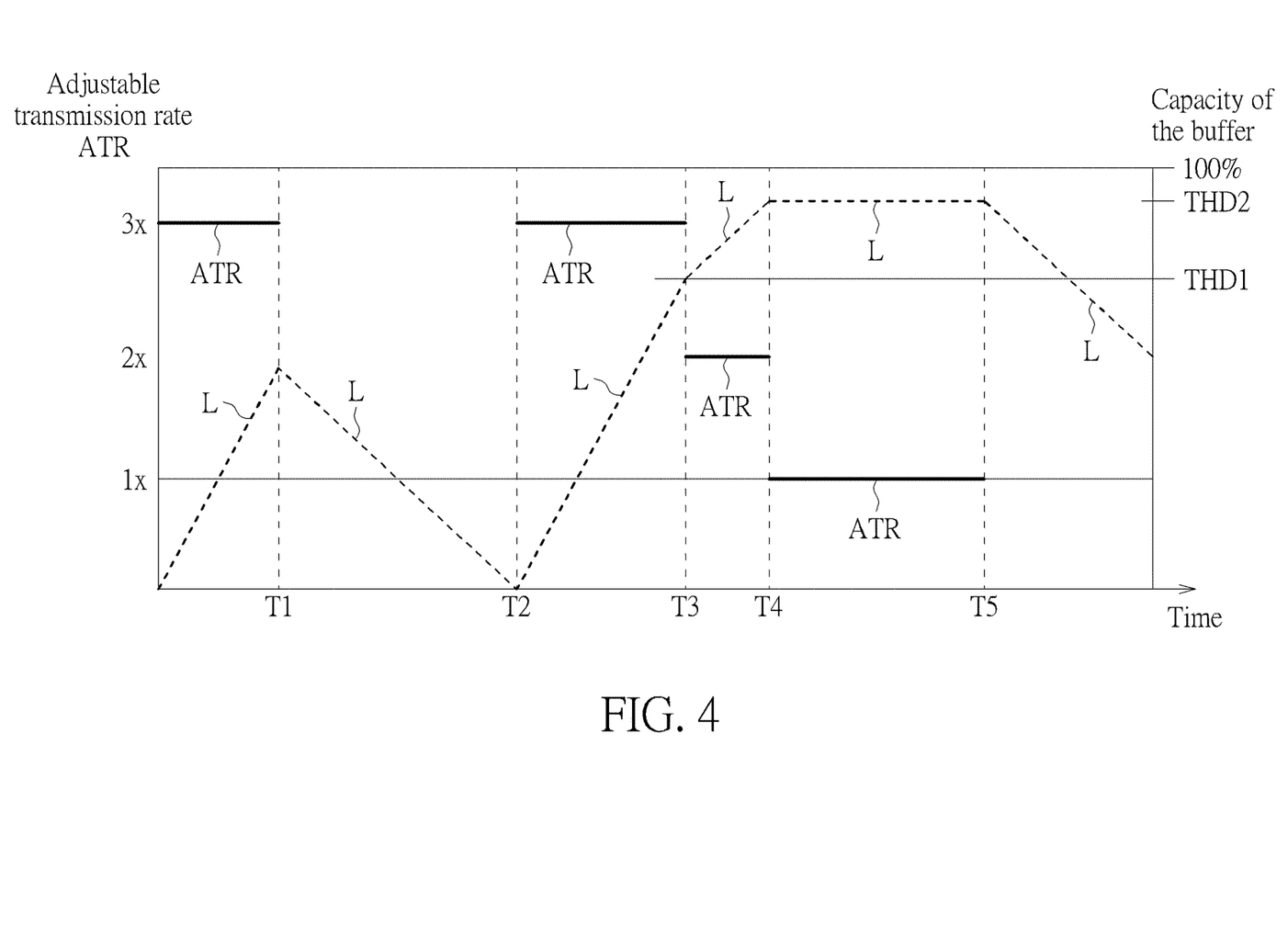
FIG. 4 is a diagram illustrating operations of the buffer and the sampling rate controller.

Taking operation of the buffer 308 and the sampling rate controller 104 as an example, an adjustable transmission rate ATR of the sampling rate controller 104 is defined as a product of [coordinate transmission rate] and [sampling rate of the sampling rate controller 104], the adjustable transmission rate ATR is a transmission rate for writing to the buffer 308, and bandwidth of the transmitter 106 is defined as a transmission rate for data stored in the buffer 308 being read and transmitted to the receiver 202. In addition, [the adjustable transmission rate ATR] minus [the bandwidth of the transmitter 106] equals to a rate for data being held in the buffer 308, that the rate is positive represents the data stored in the buffer 308 being increased, and that the rate is negative represents the data stored in the buffer 308 being reduced. A default generation rate (bandwidth) of the plurality of coordinates TDC is three times the bandwidth (1×) of the transmitter 106, so under a default sampling rate (1×), a transmission rate (bandwidth) of the sampling rate controller 104 is three times the bandwidth (1×) of the transmitter 106. As shown in FIG. 4, the transmitter 106 always transmits coordinates to the receiver 202 at 1× transmission rate (i.e. 1× bandwidth). Before, a time T1, because the adjustable transmission rate ATR (wherein the adjustable transmission rate ATR=the product of the coordinate transmission rate and the sampling rate of the sampling rate controller 104) of the sampling rate controller 104 is a default transmission rate, and is equal to 3 times the bandwidth (1×) of the transmitter 106 (wherein the default transmission rate is represented by a label 3×, and the default transmission rate is the bandwidth of the sampling rate controller 104 and equals to a product (3×) of the coordinate transmission rate (3×) and a default sampling rate (1×) of the sampling rate controller 104), when the sampling rate controller 104 utilizes the default sampling rate to sample the plurality of coordinates TDC and stores a plurality of sampled coordinates in the buffer 308, amount of coordinates stored in the buffer 308 (a dashed line L shown in FIG. 4) is increased by 2× (because the default transmission rate (3×) is the bandwidth of the sampling rate controller 104 and equals to 3 times the bandwidth of the transmitter 106 (1×), for the buffer 308, the coordinates stored in the buffer 308 is increased by 3× (corresponding to the sampling rate controller 104), but is reduced by 1× (corresponding to the transmitter 106), finally resulting in the coordinates stored in the buffer 308 being increased by 2×). Between the time T1 and the time T2, because no coordinate is generated (for example, between the time T1 and the time T2, the plurality of coordinates TDC are invalid, so the sampling rate controller 104 does not sample the plurality of coordinates TDC), the amount of the coordinates stored in the buffer 308 (the dashed line L shown in FIG. 4) is reduced by 1×. Between the time T2 and a time T3, a transmission rate of the adjustable transmission rate ATR of the sampling rate controller 104 is still the default transmission rate. Therefore, between the time T2 and the time T3, because the sampling rate controller 104 can utilize the default sampling rate to sample the plurality of coordinates TDC, and store the plurality of sampled coordinates in the buffer 308, the amount of the coordinates in the buffer 308 (the dashed line L shown in FIG. 4) is increased by 2×, wherein at the time T3, the amount of the coordinates stored in the buffer 308 achieves a first threshold THD1. Therefore, between the time T3 and a time T4, because the amount of the coordinates stored in the buffer 308 achieves the first threshold THD1, the sampling rate controller 104 adjusts the adjustable transmission rate ATR to be 2 times (named as a first transmission rate, wherein the first transmission rate is represented by a label 2× (because the coordinate transmission rate (3)×a first sampling rate (⅔) of the sampling rate controller 104=2)) the bandwidth (1×) of the transmitter 106. Between the time T3 and the time T4, because the transmission rate of the adjustable transmission rate ATR of the sampling rate controller 104 is the first transmission rate, when the sampling rate controller 104 utilizes the first sampling rate to sample the plurality of coordinates TDC and stores the plurality of sampled coordinates to the buffer 308, the amount of the coordinates stored in the buffer 308 (the dashed line L shown in FIG. 4) is increased by 1× (because the first transmission rate is 2 times the bandwidth of the transmitter 106 (1×), for the buffer 308, the coordinates stored in the buffer 308 is increased by 2× (corresponding to the sampling rate controller 104), but is reduced by 1× (corresponding to the transmitter 106), finally resulting in the coordinates in the buffer 308 being increased by 1×), wherein at the time T4, the amount of the coordinates stored in the buffer 308 achieves a second threshold THD2. Between the time T4 and a time T5, because the amount of the coordinates stored in the buffer 308 achieves the second threshold THD2, the sampling rate controller 104 adjusts the adjustable transmission rate ATR again to be 1 time (named as a second transmission rate, wherein the second transmission rate is represented by a label 1× (because the coordinate transmission rate (3)×a second sampling rate (⅓) of the sampling rate controller 104=1)) the bandwidth of the transmitter 106 (1×). Therefore, between the time T4 and the time T5, because the transmission rate of the adjustable transmission rate ATR of the sampling rate controller 104 is the second transmission rate, when the sampling rate controller 104 utilizes the second sampling rate to sample the plurality of coordinates TDC and stores the plurality of sampled coordinates to the buffer 308, the amount of the coordinates in the buffer 308 (the dashed line L shown in FIG. 4) (the dashed line L shown in FIG. 4) is not increased any more (because the transmitter 106 always transmits coordinates to the receiver 202 by 1× transmission rate, and the second transmission rate equals to the bandwidth of the transmitter 106 (1×)). At the time T5, because no coordinate TDC is generated (for example, after the time T5, the plurality of coordinates TDC are invalid, the sampling rate controller 104 does not sample the plurality of coordinates TDC), the amount of the coordinates stored in the buffer 308 (the dashed line L shown in FIG. 4) is reduced by 1×.

In addition, in another embodiment of the present invention, when the amount of the coordinates stored in the buffer 308 achieves a threshold, the sampling rate controller 104 does not sample (that is, coordinates can be discarded any time, and a sampling rate of the sampling rate controller 104 is equal to 0) the plurality of coordinates TDC; when the amount of the coordinates stored in the buffer 308 is less than the threshold, the sampling rate controller 104 utilizes the default sampling rate to sample the plurality of coordinates TDC.

Figure 5:
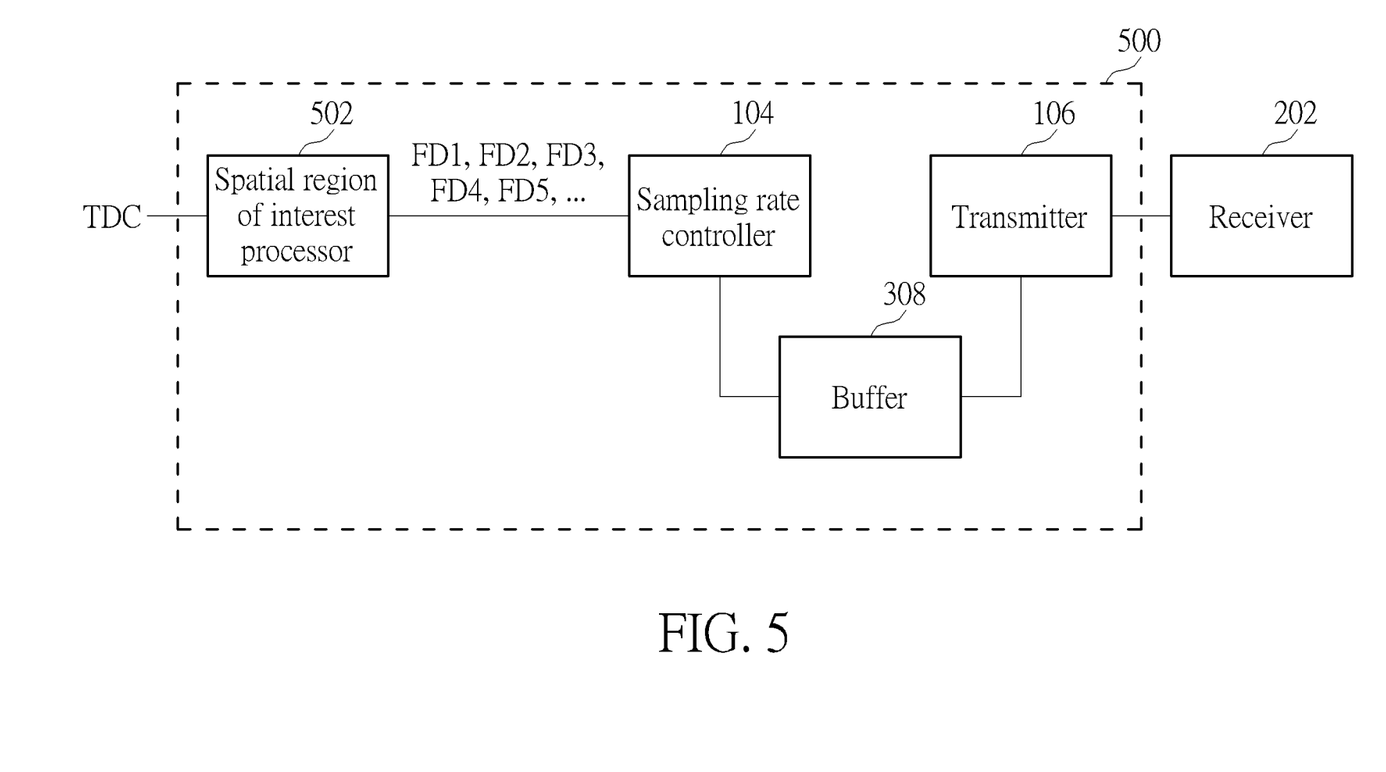
FIG. 5 is a diagram illustrating a processing system for reducing data amount of a point cloud according to a third embodiment of the present invention.
Figure 6:
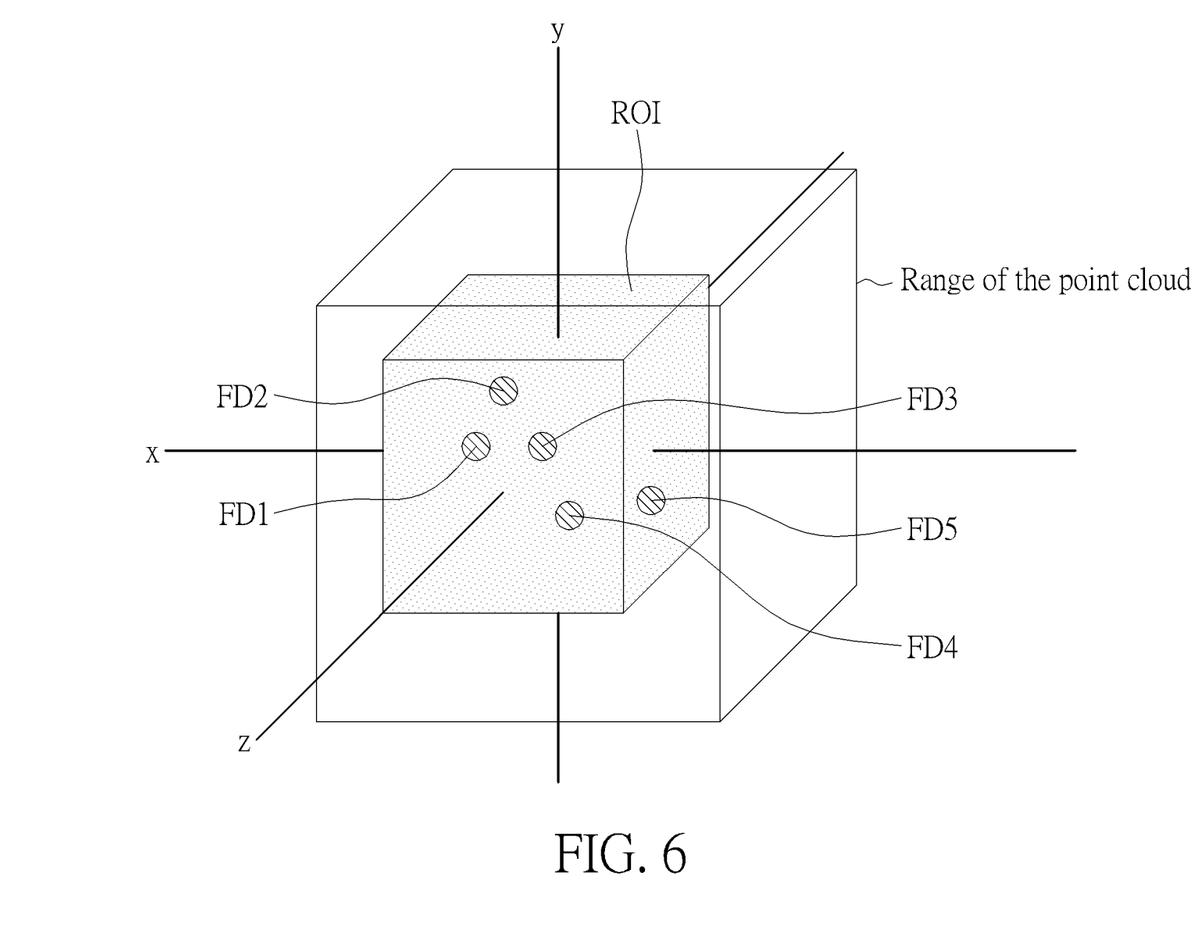
FIG. 6 is a diagram illustrating the spatial region of interest processor determining the spatial region of interest.

Please refer to FIG. 5. FIG. 5 is a diagram illustrating a processing system 500 for reducing data amount of a point cloud according to a third embodiment of the present invention. As shown in FIG. 5, a difference between the processing system 500 and the processing system 300 is that the processing system 500 further includes a spatial region of interest processor 502, wherein coupling relationships between the spatial region of interest processor 502, the sampling rate controller 104, the transmitter 106, and the buffer 308 can be referred to FIG. 5, so further description thereof is omitted for simplicity. Please refer to FIG. 6. FIG. 6 is a diagram illustrating the spatial region of interest processor 502 determining a spatial region of interest ROI. As shown in FIG. 6, after the spatial region of interest processor 502 determines the spatial region of interest ROI, the spatial region of interest processor 502 will discard coordinates of the plurality of coordinates TDC, which are outside the spatial region of interest ROI to keep a plurality of first coordinates (e.g. first coordinates FD1, FD2, FD3, FD4, FD5 . . . , and so on) within the spatial region of interest ROI, and transmit the plurality of first coordinates to the sampling rate controller 104, wherein operational principles of the sampling rate controller 104 sampling the plurality of first coordinates to generate a plurality of sampled first coordinates can be referred to corresponding descriptions of the processing systems 100, 300, so further description thereof is omitted for simplicity. In addition, because the spatial region of interest processor 502 will discard the coordinates of the plurality of coordinates TDC, which are outside the spatial region of interest ROI, it is obvious that the data amount of the plurality of coordinates TDC is greater than data amount of the plurality of first coordinates, that is, the processing system 500 can reduce the data amount of the point cloud. In addition, in another embodiment of the present invention, the processing system 500 does not include the buffer 308, meanwhile operational principles of the processing system 500 can be referred to the processing system 100, so further description thereof is omitted for simplicity. In addition, in another embodiment of the present invention, the processing system 500 does not include the sampling rate controller 104, or the buffer 308, or the sampling rate controller 104 and the buffer 308.

In addition, because one of ordinary skill in the art should know that the spatial region of interest processor 502 can be a field programmable gate array (FPGA) with the above-mentioned functions of the spatial region of interest processor 502, or an application-specific integrated circuit (ASIC) with the above-mentioned functions of the spatial region of interest processor 502, or a software module with the above-mentioned functions of the spatial region of interest processor 502, or an analog integrated circuit with the above-mentioned functions of the spatial region of interest processor 502 according to the above-mentioned functions of the spatial region of interest processor 502, descriptions of a corresponding structure of the spatial region of interest processor 502 are omitted for simplicity.

Figure 7:
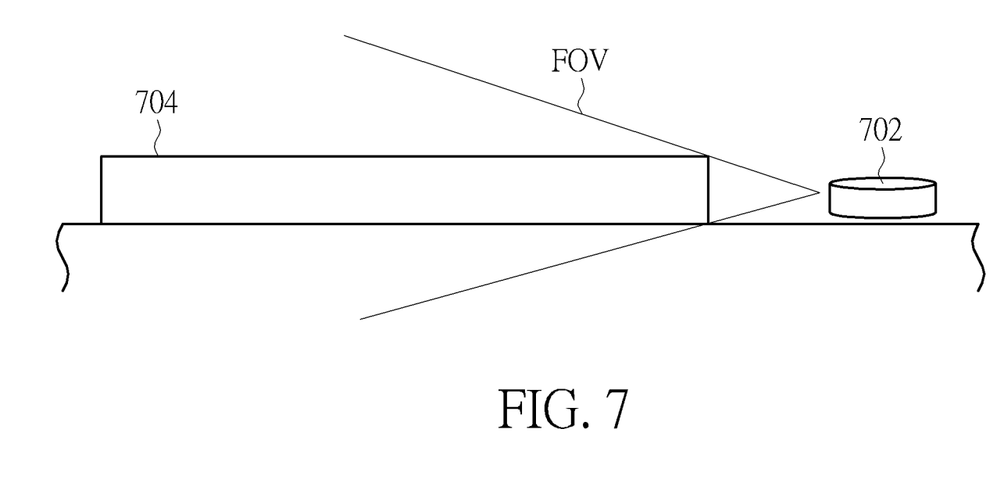
FIG. 7 is a diagram illustrating a spatial region of interest applied to the robot vacuum.
Figure 8:
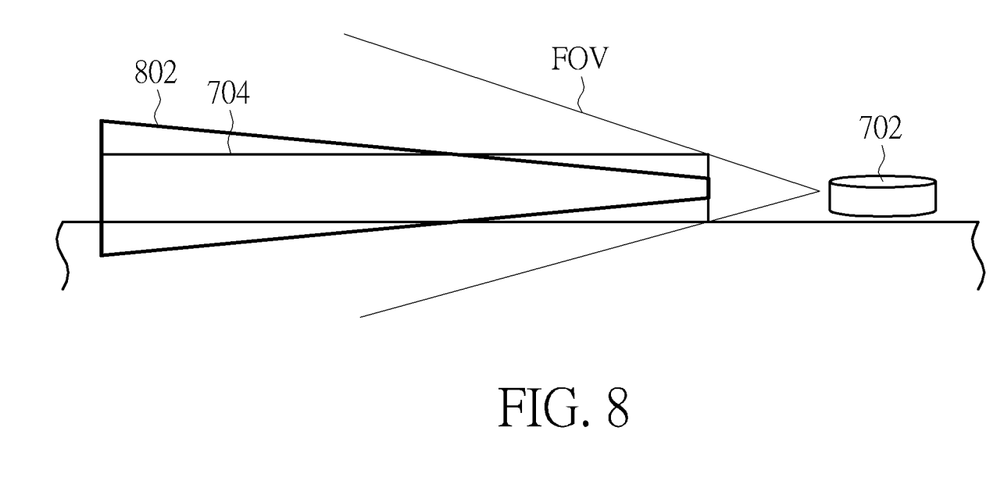
FIG. 8 is a diagram illustrating a relationship between the spatial region of interest and a traditional region of interest.
Figure 9:
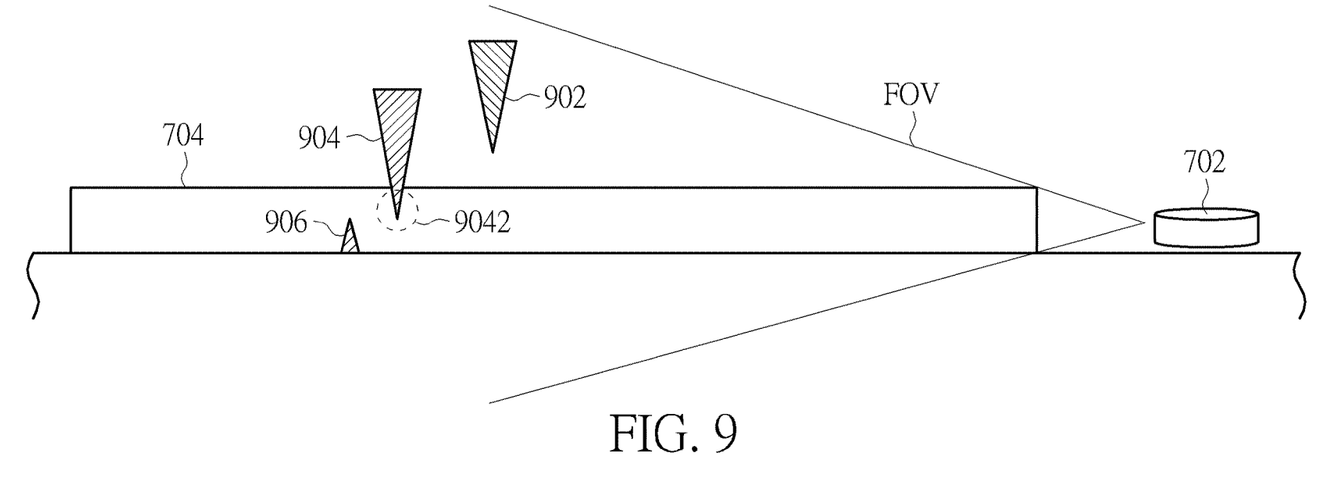
FIG. 9 is a diagram illustrating relationships between the spatial region of interest and the obstacles.
Figure 10:
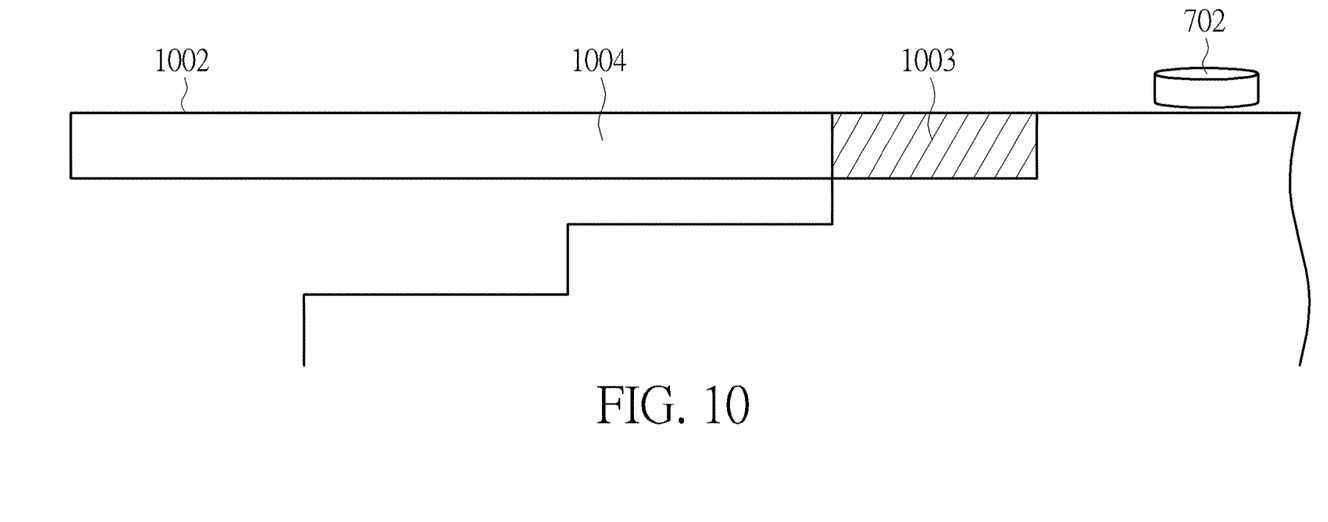
FIG. 10 is a diagram illustrating a relationship between the robot vacuum and a spatial region of interest.

Then, please refer to FIGS. 7, 8, 9, 10, wherein FIGS. 7, 8, 9, 10 take a spatial region of interest applied to a robot vacuum 702 as an example, and the processing system 500 is applied to the robot vacuum 702. FIG. 7 is a diagram illustrating a spatial region of interest 704 applied to the robot vacuum 702, FIG. 8 is a diagram illustrating a relationship between the spatial region of interest 704 and a traditional region of interest 802, FIG. 9 is a diagram illustrating relationships between the spatial region of interest 704 and obstacles, and FIG. 10 is a diagram illustrating a relationship between the robot vacuum 702 and a spatial region of interest 1002. As shown in FIG. 7, because the robot vacuum 702 is very short, the robot vacuum 702 only needs to note the spatial region of interest 704 related to a forward path, wherein a height of the spatial region of interest 704 can be set according to a height of the robot vacuum 702, and the spatial region of interest 704 is included within a field of view FOV of the robot vacuum 702. In addition, FIG. 7 only shows a side of the spatial region of interest 704. Because the height of the spatial region of interest 704 can be set according to the height of the robot vacuum 702 and the robot vacuum 702 is very short (that is, the height of the robot vacuum 702 is very small), a range of the spatial region of interest 704 is very narrow. That is, most of the plurality of coordinates TDC (outside the spatial region of interest 704) will be discarded by the spatial region of interest processor 502. Therefore, it is very obvious that data amount of the plurality of coordinates TDC is greater than data amount of the plurality of first coordinates within the spatial region of interest 704.

As shown in FIG. 8, the spatial region of interest 704 can be a three-dimensional structure, and the traditional region of interest 802 is a two-dimensional structure (that is, utilizing two-dimensional image to define a region of interest). Although both the spatial region of interest 704 and the traditional region of interest 802 are included in the field of view FOV of the robot vacuum 702, a range of the traditional region of interest 802 is larger the farther away from the robot vacuum 702. In addition, FIG. 8 only shows the side of the spatial region of interest 704 and a side of the traditional region of interest 802. Because the range of the traditional region of interest 802 is larger the farther away from the robot vacuum 702, data amount of a plurality of coordinates of the plurality of coordinates TDC within the traditional region of interest 802 is greater than the data amount of the plurality of first coordinates within the spatial region of interest 704. Therefore, the robot vacuum 702 will not utilize the traditional region of interest 802.

As shown in FIG. 9, although all obstacles 902, 904, 906 are within the field of view FOV of the robot vacuum 702, because only the obstacle 902 is totally outside the spatial region of interest 704, a processor (coupled to the receiver 202 shown in FIG. 1) of the robot vacuum 702 will execute corresponding operations only on the obstacles 904, 906 (e.g. the processor within the robot vacuum 702 re-determines a new forward path to avoid the obstacles 904, 906), rather than executing another corresponding operation on the obstacle 902 (because the height of the spatial region of interest 704 is set according to the height of the robot vacuum 702, the robot vacuum 702 does not hit the obstacle 902 when the robot vacuum 702 follows an original forward path).

As shown in FIG. 10, a spatial region of interest 1002 and the robot vacuum 702 can be located at different horizontal positions (for example, a position where the spatial region of interest 1002 is located is lower than a position where the robot vacuum 702 is located), so the processor (coupled to the receiver 202) of the robot vacuum 702 can detect whether the ground corresponding to a forward path is not safe through the spatial region of interest 1002 (for example, a stair appears at the forward path or a hole appears in the ground corresponding to the forward path). Therefore, when no stair appears at the forward path or no hole appears in the ground corresponding to the forward path, objects (that is, a floor) within the spatial region of interest 1002 should be totally detected by the processor of the robot vacuum 702. However, as shown in FIG. 10, when the stair appears at the forward path or the hole appears in the ground corresponding to the forward path, only objects (that is, a floor) within a block 1003 of the spatial region of interest 1002 can be detected by the processor of the robot vacuum 702 and no object within a block 1004 of the spatial region of interest 1002 can be detected by the processor of the robot vacuum 702, so the processor of the robot vacuum 702 determines that the stair appears at the forward path or the hole appears in the ground corresponding to the forward path, resulting in the processor of the robot vacuum 702 re-determines a new forward path.

Figure 11:
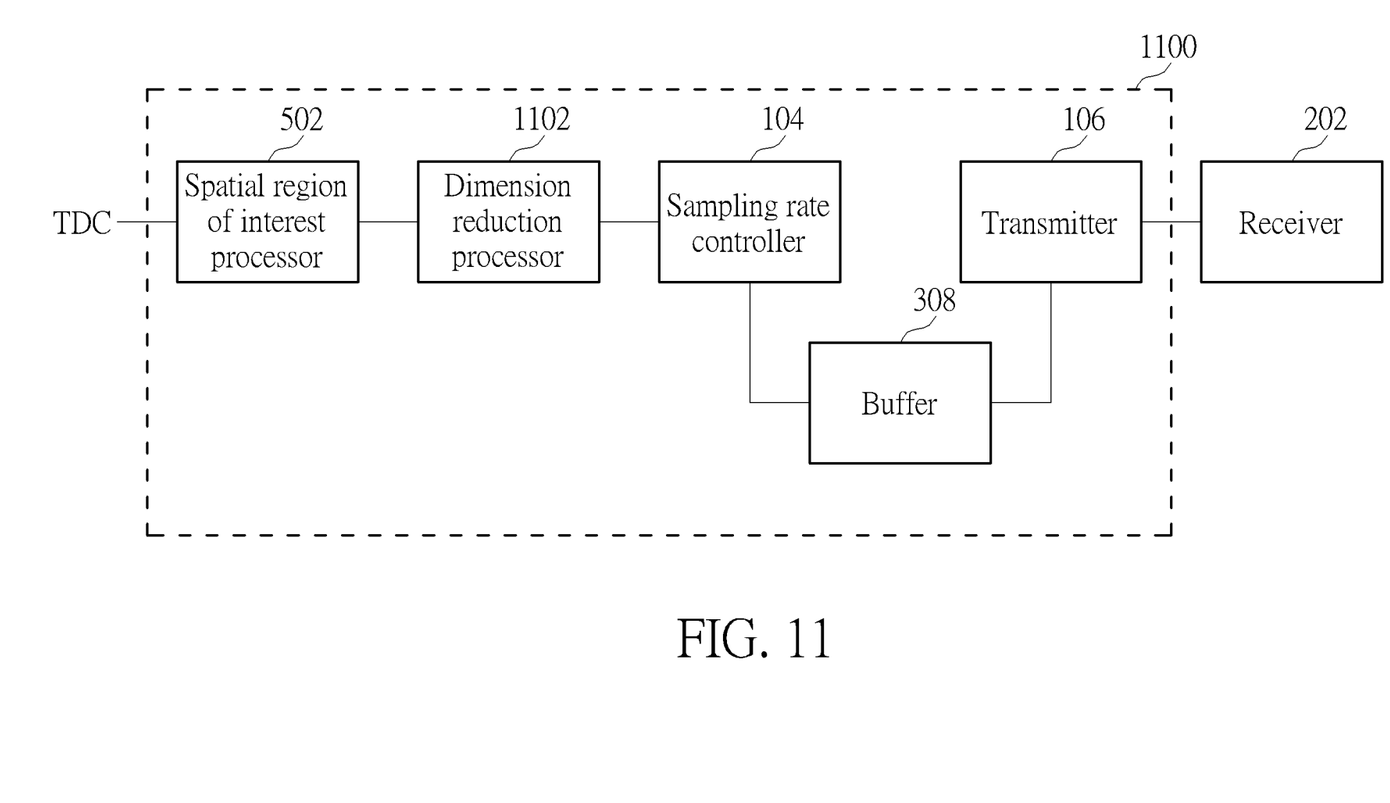
FIG. 11 is a diagram illustrating a processing system for reducing data amount of a point cloud according to a fourth embodiment of the present invention.

Please refer to FIG. 11. FIG. 11 is a diagram illustrating a processing system 1100 for reducing data amount of a point cloud according to a fourth embodiment of the present invention. As shown in FIG. 11, a difference between the processing system 1100 and the processing system 500 is that the processing system 1100 further includes a dimension reduction processor 1102, wherein coupling relationships between the dimension reduction processor 1102, the sampling rate controller 104, the transmitter 106, and the buffer 308 can be referred to FIG. 11, so further description thereof is omitted for simplicity. In some applications, the applications do not utilize all coordinate values corresponding to each coordinate. For example, taking FIG. 9 and a three-dimensional (3D) coordinate as an example, all three-dimensional coordinates with (x904, y, z904) coordinate configuration within the spatial region of interest 704 have the same effect on the robot vacuum 702. That is, because the height of the spatial region of interest 704 is set according to the height of the robot vacuum 702 (assuming the height of the robot vacuum 702 is 1), within the spatial region of interest 704, no matter objects located at a three-dimensional coordinate (x904, 1, z904), or objects located at a three-dimensional coordinate (x904, 0.5, z904), or objects located at a three-dimensional coordinate (x904, 0, z904), the robot vacuum 702 will hit. Therefore, the dimension reduction processor 1102 can convert a plurality of three-dimensional coordinates within the spatial region of interest 704 into a plurality of two-dimensional coordinates (that is, a plurality of dimension reduction coordinates) to generate a two-dimensional simultaneous localization and mapping (SLAM) corresponding to the spatial region of interest 704. That is, the dimension reduction processor 1102 can discard y coordinate of each three-dimensional coordinate of the plurality of three-dimensional coordinates within the spatial region of interest 704 to generate the plurality of two-dimensional coordinates. Therefore, as shown in FIG. 9, although a three-dimensional coordinate of a tip 9042 is (x904, 1, z904), because all three-dimensional coordinates with (x904, y, z904) coordinate configuration within the spatial region of interest 704 have the same effect on the robot vacuum 702, the processor (coupled to the receiver 202) of the robot vacuum 702 can set a flag for a 2D coordinates (x904, z904) in the two-dimensional simultaneous localization and mapping (2D SLAM) to make the robot vacuum 702 avoid the two-dimensional coordinate (x904, z904). In addition, operational principles of the sampling rate controller 104 sampling the plurality of two-dimensional coordinates in the two-dimensional simultaneous localization and mapping (SLAM) to generate a plurality of sampled two-dimensional coordinates can be referred to corresponding descriptions of the processing systems 100, 300, so further description thereof is omitted for simplicity. In addition, because the dimension reduction processor 1102 can discard y coordinate of each three-dimensional coordinate of the plurality of three-dimensional coordinates within the spatial region of interest 704 to generate the plurality of two-dimensional coordinates within the two-dimensional simultaneous localization and mapping (SLAM), it is very obvious that data amount of the plurality of three-dimensional coordinates within the spatial region of interest 704 is greater than data amount of the plurality of two-dimensional coordinates within the two-dimensional simultaneous localization and mapping (SLAM). That is, the processing system 1100 can also reduce the data amount of the point cloud. In addition, subsequently operational principles of the processing system 1100 can be referred to the processing system 500, so further description thereof is omitted for simplicity. In addition, in another embodiment of the present invention, the processing system 1100 does not include the buffer 308, meanwhile operational principles of the processing system 1100 can be referred to the processing system 100, so further description thereof is omitted for simplicity. In addition, in another embodiment of the present invention, the dimension reduction processor 1102 is installed between the sampling rate controller 104 and the buffer 308, so meanwhile the dimension reduction processor 1102 can convert the plurality of sampled coordinates generated by the sampling rate controller 104 into s plurality of sampled dimension reduction coordinates. In addition, in another embodiment of the present invention, the processing system 1100 does not include the spatial region of interest processor 502. In addition, in another embodiment of the present invention, the processing system 1100 does not include one of combinations of the spatial region of interest processor 502, the sampling rate controller 104, and the buffer 308.

In addition, because one of ordinary skill in the art should know that the dimension reduction processor 1102 can be a field programmable gate array (FPGA) with the above-mentioned functions of the dimension reduction processor 1102, or an application-specific integrated circuit (ASIC) with the above-mentioned functions of the dimension reduction processor 1102, or a software module with the above-mentioned functions of the dimension reduction processor 1102, or an analog integrated circuit with the above-mentioned functions of the dimension reduction processor 1102 according to the above-mentioned functions of the dimension reduction processor 1102, descriptions of a corresponding structure of the dimension reduction processor 1102 are omitted for simplicity.

Figure 12:
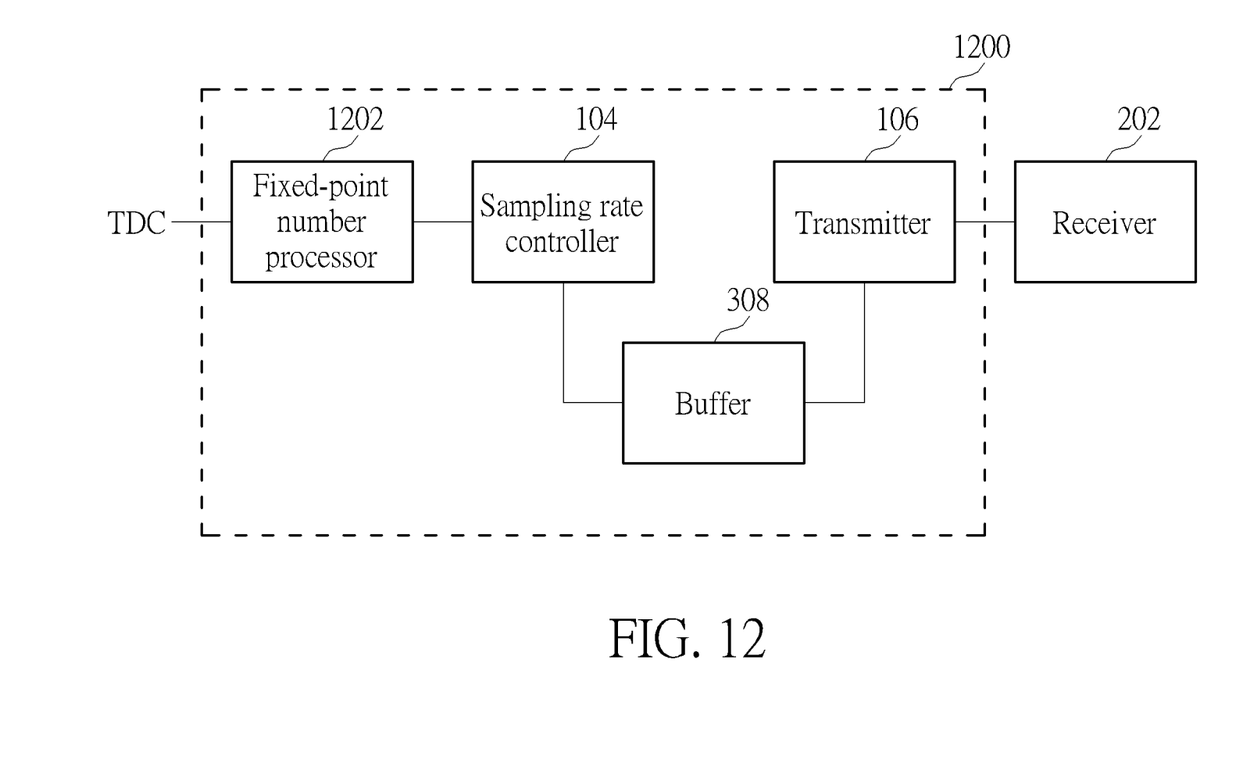
FIG. 12 is a diagram illustrating a processing system for reducing data amount of a point cloud according to a fifth embodiment of the present invention.

Please refer to FIG. 12. FIG. 12 is a diagram illustrating a processing system 1200 for reducing data amount of a point cloud according to a fifth embodiment of the present invention. As shown in FIG. 12, a difference between the processing system 1200 and the processing system 300 is that the processing system 1200 further include a fixed-point number processor 1202, wherein coupling relationships between the fixed-point number processor 1202, the sampling rate controller 104, the transmitter 106, and the buffer 308 can be referred to FIG. 12, so further description thereof is omitted for simplicity. After the fixed-point number processor 1202 receives the plurality of coordinates TDC (wherein the plurality of coordinates TDC are coordinates with a floating-point operation format), the fixed-point number processor 1202 can convert the plurality of coordinates TDC into a plurality of second coordinates with a fixed-point number operation format (for example, each dimensional coordinate of each second coordinate can be represented by 16 bits) for sampling by the sampling rate controller 104, wherein operational principles of the sampling rate controller 104 sampling the plurality of second coordinates with the fixed-point number operation format to generate a plurality of sampled second coordinates with the fixed-point number operation format can be referred to corresponding descriptions of the processing system 300, so further description thereof is omitted for simplicity. In addition, in another embodiment of the present invention, the processing system 1200 does not include the buffer 308, meanwhile operational principles of the processing system 1200 can be referred to the processing system 100, so further description thereof is omitted for simplicity. In addition, in another embodiment of the present invention, the fixed-point number processor 1202 is installed between the sampling rate controller 104 and the buffer 308, so meanwhile the fixed-point number processor 1202 can convert a plurality of sampled coordinates (with the float-point number operation format) generated by the sampling rate controller 104 into a plurality of second coordinates with the fixed-point number operation format. In addition, because the fixed-point number processor 1202 can convert the plurality of coordinates TDC into the plurality of second coordinates with the fixed-point number operation format, it is obvious that data amount of the plurality of coordinates TDC (the coordinates with the floating-point operation format) is greater than data amount of the plurality of second coordinates with the fixed-point number operation format. That is, the processing system 1200 can also reduce the data amount of the point cloud.

In addition, because one of ordinary skill in the art should know that the fixed-point number processor 1202 can be a field programmable gate array (FPGA) with the above-mentioned functions of the fixed-point number processor 1202, or an application-specific integrated circuit (ASIC) with the above-mentioned functions of the fixed-point number processor 1202, or a software module with the above-mentioned functions of the fixed-point number processor 1202, or an analog integrated circuit with the above-mentioned functions of the fixed-point number processor 1202 according to the above-mentioned functions of the fixed-point number processor 1202, descriptions of a corresponding structure of the fixed-point number processor 1202 are omitted for simplicity.

In addition, in another embodiment of the present invention, at least one of the fixed-point number processor 1202 and the dimension reduction processor 1102 can be applied to the processing system 500.

To sum up, the processing system provided by the present invention can reduce the data amount of the point cloud through one of combinations of the sampling rate controller, the spatial region of interest processor, the fixed-point number processor, and the dimension reduction processor. Therefore, compared to the prior art, the present invention can make the receiver coupled to the processing system does not need a buffer with larger capacity and a transmitter with larger bandwidth.

Although the present invention has been illustrated and described with reference to the embodiments, it is to be understood that the invention is not to be limited to the disclosed embodiments, but on the contrary, is intended to cover various modifications and equivalent arrangements included within the spirit and scope of the appended claims.

What is claimed is:

1. A processing system for reducing data amount of a point cloud, comprising:
a dimension reduction processing circuit;
a spatial region of interest processing circuit receiving a plurality of coordinates corresponding to the point cloud, determining a spatial region of interest, and discarding coordinates of the plurality of coordinates, which are outside the spatial region of interest according to the spatial region of interest to keep a plurality of first coordinates within the spatial region of interest;
a sampling rate control circuit receiving the plurality of first coordinates, wherein the sampling rate control circuit samples the plurality of first coordinates according to an adjustable sampling rate to generate a plurality of sampled first coordinates and the dimension reduction processing circuit converts the plurality of sampled first coordinates into a plurality of sampled dimension reduction first coordinates, or the dimension reduction processing circuit converts the plurality of first coordinates into a plurality of dimension reduction first coordinates and the sampling rate control circuit samples the plurality of dimension reduction first coordinates according to the adjustable sampling rate to generate the plurality of sampled dimension reduction first coordinates, wherein data amount of the plurality of coordinates is not less than data amount of the plurality of sampled dimension reduction first coordinates; and a transmission circuit coupled to the sampling rate control circuit, wherein the transmission circuit is used for outputting the plurality of sampled dimension reduction first coordinates;

wherein the sampling rate control circuit determines whether to adjust the adjustable sampling rate according to output bandwidth of the plurality of first coordinates and a buffer further comprised in the processing system.

2. The processing system of claim 1, wherein the point cloud is a three-dimensional point cloud, and the plurality of coordinates are a plurality of three-dimensional coordinates corresponding to the three-dimensional point cloud.

3. The processing system of claim 2, wherein each three-dimensional coordinate of the plurality of three-dimensional coordinates corresponds to a pixel and has a floating-point operation format.

4. A processing system for reducing data amount of a point cloud, comprising:

a dimension reduction processing circuit;

a spatial region of interest processing circuit receiving a plurality of coordinates corresponding to the point cloud, determining a spatial region of interest, and discarding coordinates of the plurality of coordinates, which are outside the spatial region of interest according to the spatial region of interest to keep a plurality of first coordinates within the spatial region of interest;

a sampling rate control circuit receiving the plurality of first coordinates, wherein the sampling rate control circuit samples the plurality of first coordinates according to an adjustable sampling rate to generate a plurality of sampled first coordinates and the dimension reduction processing circuit converts the plurality of sampled first coordinates into a plurality of sampled dimension reduction first coordinates, or the dimension reduction processing circuit converts the plurality of first coordinates into a plurality of dimension reduction first coordinates and the sampling rate control circuit samples the plurality of dimension reduction first coordinates according to the adjustable sampling rate to generate the plurality of sampled dimension reduction first coordinates, wherein data amount of the plurality of coordinates is not less than data amount of the plurality of sampled dimension reduction first coordinates; and a transmission circuit coupled to the sampling rate control circuit, wherein the transmission circuit is used for outputting the plurality of sampled dimension reduction first coordinates;

wherein the sampling rate control circuit determines whether to adjust the adjustable sampling rate according to output bandwidth of the plurality of first coordinates and a predetermined bandwidth of the transmission circuit.

5. A processing system for reducing data amount of a point cloud, comprising:

a dimension reduction processing circuit;

a fixed-point number processing circuit receiving a plurality of coordinates corresponding to the point cloud and converting the plurality of coordinates into a plurality of second coordinates with a fixed-point number operation format, wherein the plurality of coordinates has a floating-point operation format;

a sampling rate control circuit receiving the plurality of second coordinates, wherein the sampling rate control circuit samples the plurality of second coordinates according to an adjustable sampling rate to generate a plurality of sampled second coordinates and the dimension reduction processing circuit converts the plurality of sampled second coordinates into a plurality of sampled dimension reduction second coordinates, or the dimension reduction processing circuit converts the plurality of second coordinates into a plurality of dimension reduction second coordinates and the sampling rate control circuit samples the plurality of dimension reduction second coordinates according to the adjustable sampling rate to generate the plurality of sampled dimension reduction second coordinates, wherein data amount of the plurality of coordinates is not less than data amount of the plurality of sampled dimension reduction second coordinates; and a transmission circuit coupled to the sampling rate control circuit, wherein the transmission circuit is used for outputting the plurality of sampled dimension reduction second coordinates;

wherein the sampling rate control circuit determines whether to adjust the adjustable sampling rate according to output bandwidth of the plurality of second coordinates and a buffer further comprised in the processing system.

6. A processing system for reducing data amount of a point cloud, comprising:

a dimension reduction processing circuit;

a fixed-point number processing circuit receiving a plurality of coordinates corresponding to the point cloud and converting the plurality of coordinates into a plurality of second coordinates with a fixed-point number operation format, wherein the plurality of coordinates has a floating-point operation format;

a sampling rate control circuit receiving the plurality of second coordinates. wherein the sampling rate control circuit samples the plurality of second coordinates according to an adjustable sampling rate to generate a plurality of sampled second coordinates and the dimension reduction processing circuit converts the plurality of sampled second coordinates into a plurality of sampled dimension reduction second coordinates, or the dimension reduction processing circuit converts the plurality of second coordinates into a plurality of dimension reduction second coordinates and the sampling rate control circuit samples the plurality of dimension reduction second coordinates according to the adjustable sampling rate to generate the plurality of sampled dimension reduction second coordinates, wherein data amount of the plurality of coordinates is not less than data amount of the plurality of sampled dimension reduction second coordinates; and a transmission circuit coupled to the sampling rate control circuit, wherein the transmission circuit is used for outputting the plurality of sampled dimension reduction second coordinates;

wherein the sampling rate control circuit determines whether to adjust the adjustable sampling rate according to output bandwidth of the plurality of second coordinates and a predetermined bandwidth of the transmission circuit.

* * * * *